United States Patent
Grell et al.

(10) Patent No.: US 6,682,227 B2
(45) Date of Patent: Jan. 27, 2004

(54) ROLLING BEARING COMPONENT

(75) Inventors: Karl-Ludwig Grell, Aurachtal (DE); Günter Grube, Aurachtal (DE); Leo Müntnich, Aurachtal (DE)

(73) Assignee: Ina Wälzlager Schaeffler oHG (DE)

( * ) Notice: Subject to any disclaimer, the term of this patent is extended or adjusted under 35 U.S.C. 154(b) by 0 days.

(21) Appl. No.: 10/278,202

(22) Filed: Oct. 22, 2002

(65) Prior Publication Data

US 2003/0091256 A1 May 15, 2003

Related U.S. Application Data

(63) Continuation of application No. PCT/EP01/02673, filed on Mar. 9, 2001.

(30) Foreign Application Priority Data

Apr. 22, 2000 (DE) .......................................... 100 20 118

(51) Int. Cl.⁷ ................................................ F16C 33/64
(52) U.S. Cl. ...................... 384/569; 384/492; 384/625; 384/912
(58) Field of Search ................................. 384/569, 625, 384/912, 492, 570

(56) References Cited

U.S. PATENT DOCUMENTS

| | | | |
|---|---|---|---|
| 5,658,082 A | 8/1997 | Tsushima et al. | 384/492 |
| 5,672,014 A | 9/1997 | Okita et al. | 384/492 |

FOREIGN PATENT DOCUMENTS

| | | |
|---|---|---|
| DE | 1034932 | 7/1958 |
| DE | 3528782 | 2/1987 |
| DE | 3803064 | 4/1989 |
| DE | 19529379 | 5/1996 |
| DE | 19547181 | 10/1996 |
| DE | 19610675 | 2/1997 |
| DE | 19622164 | 5/1997 |
| DE | 19618065 | 11/1997 |
| DE | 19634524 | 4/1998 |
| DE | 19826963 | 1/1999 |
| DE | 19834361 | 2/2000 |

OTHER PUBLICATIONS

M. Albert, et al., "Wälzlager, Theorie und Praxis", Springer–Verlag, Wien, New York, 1987, p. 14.

*Primary Examiner*—Lenard A Footland
(74) *Attorney, Agent, or Firm*—Ostrolenk, Faber, Gerb & Soffen, LLP

(57) ABSTRACT

A needle case or needle bush produced without cutting for a thin-walled needle bearing is produced without cutting from a cold-rolled strip, which is a heat-treated steel which has the disclosed chemical composition and the disclosed mechanical characteristic values. After a heat treatment, a surface hardness of 860 to 880 HV and a core hardness of 550 to 650 HV are achieved.

7 Claims, 1 Drawing Sheet

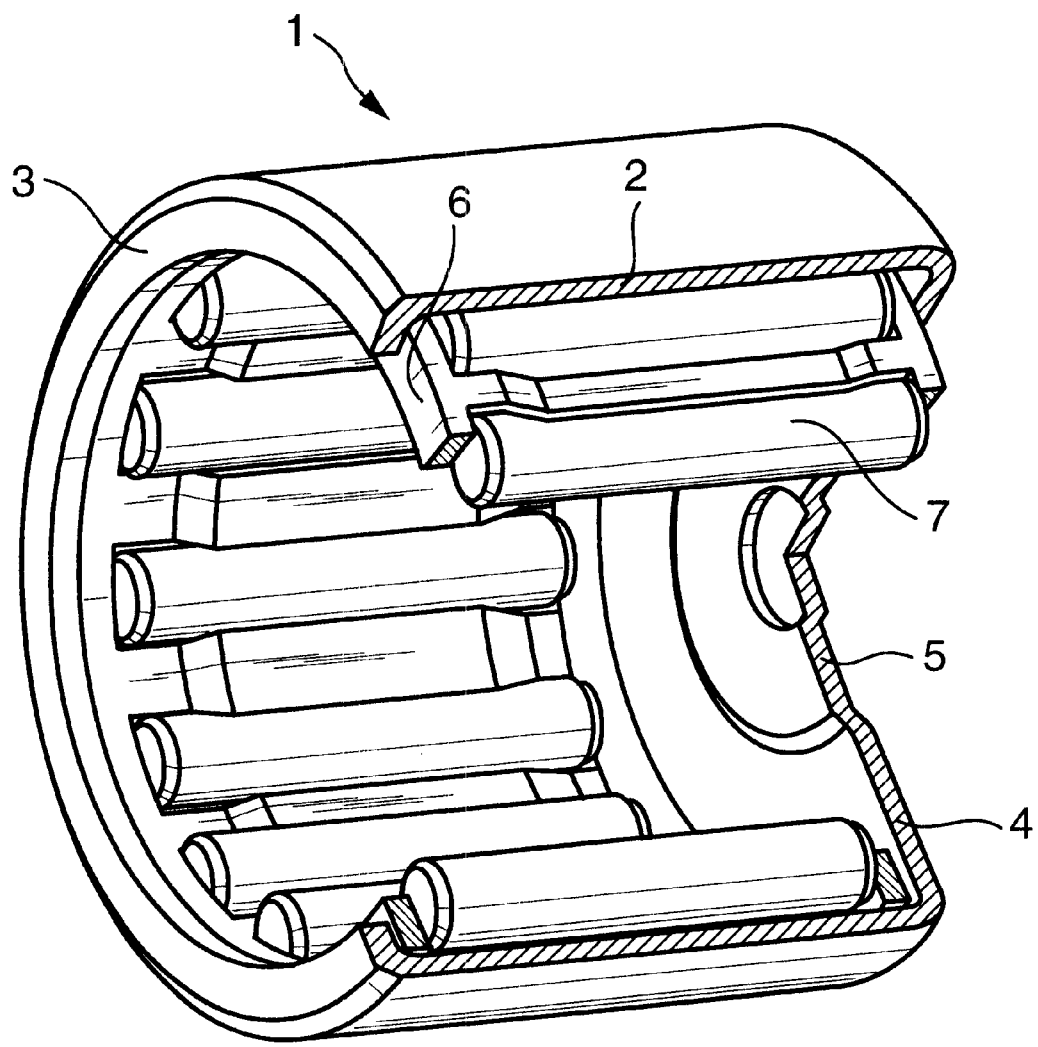

ROLLING BEARING COMPONENT

CROSS-REFERENCE TO RELATED APPLICATION

This is a continuation application of PCT/EP01/02673 filed Mar. 9, 2001, which PCT application claims priority of German application number 100 20 118.0 filed Apr. 22, 2000.

APPLICATION AREA OF THE INVENTION

The invention relates to thin-walled rolling bearing components, such as rolling bearing rings, needle cases or needle bushes, which are produced without cutting from a cold-rolled strip.

BACKGROUND OF THE INVENTION

Cold-rolled steel strip is in widespread use for the production of cold-formed products. The increasing demands with regard to the application and use properties require better mechanical, in particular deformation properties. Good deformability is characterized by r values, which characterize the deep-drawing properties, and which are as high as possible; n values, which characterize the stretch-forming properties, and which are high; and elongation values, which characterize the plane strain properties which are high. In this context, it has proven advantageous if the deformation properties are as uniform as possible in the various directions, in particular in the longitudinal, transverse and diagonal directions i.e. are substantially isotropic. The advantages of isotropic properties manifest themselves essentially in a uniformity of the flow of material and a reduction in the sheet scrap. For an example, see DE 195 47 181 C1.

In this context, it is known to the person skilled in the art that what are known as circular-casing bearings, such as needle bearings or needle bushes, represent a particular branch of rolling bearing technology, differentiating them from solid rolling bearings of radial design. These circular-casing bearings retain their roundness and shape by being pressed into a bore, so that the case material is subject to permanent compressive stresses. These compressive stresses, which are produced as a result of the bearings being pressed into the bore, act cumulatively with the load stresses which occur during operation of the bearing, and consequently the material used has to satisfy high demands. In particular, it is to be readily deformable and is to be suitable for a heat treatment in order to achieve the desired mechanical characteristic values.

DE 10 34 932 describes a process for producing a needle bearing, in which the running case is firstly produced with a fixed rim, and a cage holding rolling bodies is introduced into this open case before a captive structural assembly is formed by bending over the second rim. Then, the case and cage are subjected to a common hardening operation. According to this prior art, thin-walled outer and inner races for needle bearings are produced without cutting from a deep-drawable cold-rolled strip, the cold-rolled strip being a case-hardening steel, for example of types CK15, St4, C22, 15Cr3 or 16MnCr5. A precondition for this production process is uniform isotropic deformability of the cold-rolled strip. In an individual stage or in a plurality of stages in succession, the parts are shear-formed from the strip of defined thickness, calibrated to a high dimensional accuracy and shaped so as to have uniform wall thicknesses. To make the parts which are formed resistant to wear and to ensure that they have the required load-bearing capacity, they are case-hardened. This is achieved by carburization without or with the addition of nitrogen (carbonitriding) in what are known as case-hardening furnaces at temperatures between 830 and 930° C. Depending on the case-hardening depth required, this means a heat treatment of up to 2 hours and more.

Processes are known for producing needle bearings in which the case which is formed is inductively tempered again at what is known as the flanged rim after the hardening, in order for the cage to be pushed in, before the flanged rim is then folded over again. However, this inductive tempering process is highly complex and therefore expensive and also has an adverse effect on the overall dimensional accuracy and on the formation of cracks in the flanged area.

SUMMARY OF THE INVENTION

Therefore, it is an object of the invention to develop a readily deformable material which is suitable for a heat treatment and in particular is eminently suitable for the specific application of thin-walled needle bearings.

According to the invention, this object is achieved, by the fact that the cold-rolled strip is a heat-treated steel with the following mechanical characteristic values:

a tensile strength $\leq 480$ N/mm$^2$ an elongation at break $\geq 24\%$ a yield strength $\leq 380$ N/mm$^2$ an anisotropy value R of 0.85 to 1.05 with an $\Delta$Rmax=0.3 mm and after the heat treatment the cold-formed rolling bearing component has a surface hardness of $\geq 700$ HV and a core hardness of $\leq 650$ HV.

The rolling bearing components which are produced from the cold-rolled strip, such as cases or bushes, are austenitized, with or without complete filling, by means of brief heating in a continuous hardening furnace with a carburizing protective atmosphere over the course of a few minutes, up to at most 30 minutes. Slight decarburization of the cold-rolled strip is compensated for by a carburizing protective-gas atmosphere. An increased supply of carbon or nitrogen by means of a controlled carburizing atmosphere leads to a surface hardness on the finished component of at least 700 HV and a defined volumetric level of residual austenite and martensite. The new characteristic property of this heat-treated component is that the deeper layers of material, on account of their alloying composition, retain a load-bearing heat-treated strength with sufficient plasticity as a function of wall thickness and quenching conditions.

For example, according to a further feature described, the heat-treated steel has the following chemical composition:

| | | | |
|---|---|---|---|
| 0.30–0.55 | % | of | C |
| max. 0.15 | % | of | Si |
| 0.3–1.0 | % | of | Mn |
| max. 0.15 | % | of | Mo |
| Max. 0.50 | % | of | Cr |
| max. 0.015 | % | of | P |
| max. 0.005 | % | of | S |
| max. 0.20 | % | of | Cu |
| max. 0.20 | % | of | Ni |
| max. 0.005 | % | of | Sn |
| max. 0.002 | % | of | Sb |

-continued

| | | | |
|---|---|---|---|
| 0.60–1.25 | % | | Sum of Cu, Ni, Mn, Cr |
| 0.002–0.080 | % | | Sum of Al, Ti, Nb |
| 0.004–0.010 | % | of | N2 |

According to another feature of the invention, the surface hardness should be 860–880 HV and the core hardness should be 550–650 HV.

The cold-rolled strip has the following chemical composition, depending on its wall thickness:

| | |
|---|---|
| 0.6–1.1 mm: | 0.30–0.40% of C, max. 0.10% of Si, 0.4–0.6% of Mn, max. 0.05% of Mo, 0.20–0.30% of Cr, 0.015% of P, 0.005% of S, |
| 1.1–1.8 mm: | 0.30–0.50% of C, max. 0.10% of Si, 0.6–0.8% of Mn, max. 0.05% of Mo, 0.20–0.30% of Cr, 0.015% of P, 0.005% of S, |
| 1.8–3.5 mm: | 0.40–0.55% of C, 0.10% of Si, 0.8–1.0% of Mn, 0.15% of Mo, 0.30–0.40% of Cr, 0.015% of P, 0.005% of S. |

Since the hardenability, as is known to a person skilled in the art, is dependent on the chemical composition and the wall thickness of the cold-rolled strip, the stepped classification of the alloying elements means that the desired core hardness of 550–650 HV is always achieved for all thicknesses of the cold-rolled strip.

The cage comprises a case-hardening steel of type St3, Ck15 or C22, and the rolling bodies are produced from a steel which hardens all the way through, of type 100Cr6. If the entire bearing assembly is subjected to the heat treatment, this leads to an increasing wear resistance in the cage and also to an improvement in the fatigue loads which can be supported. The rolling bodies, such as needles or balls made from 100Cr6, are likewise hardened once again to a sufficient extent by the heat treatment process described and are therefore not adversely affected. Overall, the combination of material and heat treatment process creates a low-distortion bearing which is distinguished by economic production.

To achieve the desired mechanical properties of the rolling bearing components, the austenitizing takes place in a carburizing or carburizing/nitriding protective-gas atmosphere at 840–870° C. over the course of at most 30 minutes.

The tempering is performed in a temperature range of 180–280° C., so that a microstructural mix of martensite and austenite is formed, and a controllable change in the shape and dimensions of the part can be achieved according to the volumetric level of austenite with respect to martensite, since at a higher tempering temperature, the austenite is converted into martensite and different specific atomic lattice thicknesses are present.

The invention is explained in more detail with reference to the following exemplary embodiment.

BRIEF DESCRIPTION OF THE DRAWING

FIG. 1 shows a perspective view of a needle case.

IN-DEPTH DESCRIPTION OF THE DRAWING

The needle bush 1 shown in FIG. 1 has a radial section 2 with a profile in the form of a circular ring which, at one lateral or axial end, merges into the radially inwardly directed rim 3 and, at the other lateral or axial end, is closed off by the base 4. Bearing needles 7 which are guided in the cage 6 roll between the base 4, which is provided with the elevation 5, and the rim 3. Needle bushes 1 of this type close off bearings at shaft ends.

The needle bush 1 is formed by a plurality of deformation steps, without cutting, from a 1.2 mm thick cold-rolled strip of a heat-treated steel with the following chemical composition: 0.40% of C, 0.10% of Si, 0.5% of Mn, 0.10% of Mo, 0.3% of Cr, 0.01% of P, 0.005% of S, 0.1% of Cu, 0.1% of Ni, 0.005% of Sn, 0.002% of Sb, with the sum of Cu, Ni, Mn and Cr amounting to 1.02%. Moreover, elements which stabilize fine grains, such as aluminum, titanium and niobium, were present in a total amount of 0.06%. The cage 6 is made from a case-hardening steel of type St3, while the bearing needles 7 are made from a steel which hardens all the way through, of type 100Cr6. After cage 6 with bearing needles 7 is introduced into the needle bush 1, the rim 3 is flanged over so that a captive assembly was formed.

The needle bush 1 fitted with bearing needles 7 and cage 6 is then subjected to a hardening treatment. The complete component is held at the hardening temperature of 850° for 25 minutes and then quenched. After the hardening operation, a tempering process is carried out in order to improve the toughness of the needle bush. In the tempering process, the assembly is heated to approximately 200° and is held at this temperature for a certain time. A measurement carried out on the needle bush showed that it had a surface hardness of 810 HV and a core hardness of 600 HV.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A thin-walled rolling bearing component, which is produced without cutting from a cold-rolled strip, wherein the cold-rolled strip is a heat-treated steel with the following mechanical characteristic values:

a tensile strength $\leq 480$ N/mm$^2$ an elongation at break $\geq 24\%$ a yield strength $\leq 380$ N/mm$^2$ an anisotropy value R of 0.85 to 1.05 with an $\Delta Rmax=0.3$ mm and after a heat treatment, the cold-formed rolling bearing component has a surface hardness of $\geq 700$ HV and a core hardness of $\leq 650$ HV.

2. The rolling bearing component of claim 1, wherein the component is selected from the group consisting of a needle case and a needle bush.

3. The rolling bearing component of claim 1, wherein the heat-treated steel has a chemical composition of:

| | | | |
|---|---|---|---|
| 0.30–0.55 | % | of | C |
| max. 0.15 | % | Of | Si |
| 0.3–1.0 | % | Of | Mn |
| max. 0.15 | % | of | Mo |
| Max. 0.50 | % | of | Cr |
| max. 0.015 | % | of | P |
| max. 0.005 | % | of | S |
| max. 0.20 | % | of | Cu |
| max. 0.20 | % | of | Ni |
| max. 0.005 | % | of | Sn |
| max. 0.002 | % | of | Sb |
| 0.60–1.25 | % | | sum of Cu, Ni, Mn, Cr |
| 0.002–0.080 | % | | Sum of Al, Ti, Nb |
| 0.004–0.010 | % | of | N2. |

4. The rolling bearing component of claim 1, wherein the surface hardness is 860–880 HV and the core hardness is 550–650 HV.

5. The rolling bearing component of claim 1, wherein the cold-rolled strip has a chemical composition selected dependent on its wall thickness:

| | |
|---|---|
| 0.6–1.1 mm: | 0.30–0.40% of C, max. 0.10% of Si, 0.4–0.6% of Mn, max. 0.05% of Mo, 0.20–0.30% of Cr, 0.015% of P, 0.005% of S, |
| 1.1–1.8 mm: | 0.30–0.50% of C, max. 0.10% of Si, 0.6–0.8% of Mn, max. 0.05% of Mo, 0.20–0.30% of Cr, 0.015% of P, 0.005% of S, |
| 1.8–3.5 mm: | 0.40–0.55% of C, 0.10% of Si, 0.8–1.0% of Mn, 0.15% of Mo, 0.30–0.40% of Cr, 0.015% of P, 0.005% of S. |

6. A needle bearing comprising, a rolling bearing component of claim 1, and a cage included in the bearing component, wherein the cage is a case-hardening steel of type St3, Ck15 or C22.

7. A needle bearing comprising, a rolling bearing component of claim 1, and rolling bodies in the component, wherein the rolling bodies are of a steel which hardens all the way through and are of type 100Cr6.

* * * * *